(12) United States Patent
Martín Sánchez et al.

(10) Patent No.: US 9,211,484 B2
(45) Date of Patent: Dec. 15, 2015

(54) PLANT FOR RECOVERING DEGRADED HEAT TRANSFER OIL FROM A SOLAR THERMAL FACILITY AND METHOD FOR SAID RECOVERY

(75) Inventors: Manuel Martín Sánchez, Sevilla (ES); Antonio Campos Marín, Sevilla (ES); Miguel Trigueros González, Sevilla (ES); Pedro Ollero De Castro, Sevilla (ES); Francisco Javier Gutiérrez Ortiz, Sevilla (ES); Angel Luis Villanueva Perales, Sevilla (ES)

(73) Assignee: ABENGOA SOLAR NEW TECHNOLOGIES, S.A., Seville (ES)

( * ) Notice: Subject to any disclaimer, the term of this patent is extended or adjusted under 35 U.S.C. 154(b) by 272 days.

(21) Appl. No.: 13/697,659

(22) PCT Filed: May 12, 2011

(86) PCT No.: PCT/ES2011/070341
§ 371 (c)(1),
(2), (4) Date: Jan. 28, 2013

(87) PCT Pub. No.: WO2011/141609
PCT Pub. Date: Nov. 17, 2011

(65) Prior Publication Data
US 2013/0118890 A1    May 16, 2013

(30) Foreign Application Priority Data

May 13, 2010 (ES) .................................. 201030711

(51) Int. Cl.
*B01D 3/00* (2006.01)
*B01D 3/42* (2006.01)
(Continued)

(52) U.S. Cl.
CPC *B01D 3/143* (2013.01); *B01D 3/00* (2013.01); *B01D 5/006* (2013.01); *B01D 17/048* (2013.01); *C10G 7/006* (2013.01); *C10G 7/12* (2013.01); *B01D 3/4211* (2013.01); *C10G 2300/1007* (2013.01)

(58) Field of Classification Search
CPC .......... B01D 1/148; B01D 3/00; B01D 3/143; B01D 3/4211; B01D 3/4294; B01D 5/006; B01D 5/0051; B01D 17/048; C10G 7/006; C10G 7/12; C10G 2300/1007; F24J 2/00; Y10S 203/01; Y10S 203/08; Y10S 203/18; Y10S 203/90; Y10S 208/01
See application file for complete search history.

(56) References Cited

U.S. PATENT DOCUMENTS 2,317,101 A * 4/1943 Lecky ........................... 261/79.2
2,673,833 A * 3/1954 Radasch ........................... 208/2
(Continued)

OTHER PUBLICATIONS

SFERA—Solar Facilities for the European Research Area—2008.*
(Continued)

Primary Examiner — Virginia Manoharan
(74) Attorney, Agent, or Firm — Blank Rome LLP

(57) ABSTRACT

The present invention relates to a plan and a process for regenerating degraded heat transfer oil. The plant includes a distillation column for separating heavy components. The distillation column has an upper part and a lower part, the upper part having: a first inlet for receiving degraded oil, and a head having a first outlet for expelling light component vapor. The plant also includes a rectifier, for receiving the vapor, and having: an upper part having a second outlet for expelling light components; and a lower part having a third outlet for expelling regenerated oil. The distillation column further includes a fourth outlet for letting heavy components out in the lower part of the distillation column, a pressure transmitter at the first inlet, a pressure and temperature transmitter at the first outlet, temperature transmitters inside the distillation column, level switches, an automatic valve at the fourth outlet, and an electric resistance for maintaining the oil in a liquid state.

18 Claims, 1 Drawing Sheet

(51) Int. Cl.
  *C10G 7/12* (2006.01)
  *B01D 3/14* (2006.01)
  *B01D 5/00* (2006.01)
  *C10G 7/00* (2006.01)
  *B01D 17/04* (2006.01)

(56) References Cited

U.S. PATENT DOCUMENTS

| | | | |
|---|---|---|---|
| 2,809,924 A * | 10/1957 | Middleton | 196/139 |
| 2,912,377 A * | 11/1959 | Lehrian | 208/353 |
| 4,139,418 A | 2/1979 | Sech | |
| 4,230,536 A | 10/1980 | Sech | |
| 4,288,297 A * | 9/1981 | Karnofsky et al. | 203/81 |
| 4,305,790 A * | 12/1981 | Kramer, Sr. | 203/19 |
| 5,730,002 A * | 3/1998 | Collin et al. | 62/620 |

OTHER PUBLICATIONS

Henderson, T.R., et al., Heat Degradation Studies of Solar Heat Transfer Fluids, Solar Energy, vol. 27, No. 2, pp. 121-128, 1981.
International Search Report issued in PCT/ES2011/070341 on Oct. 3, 2011.

* cited by examiner

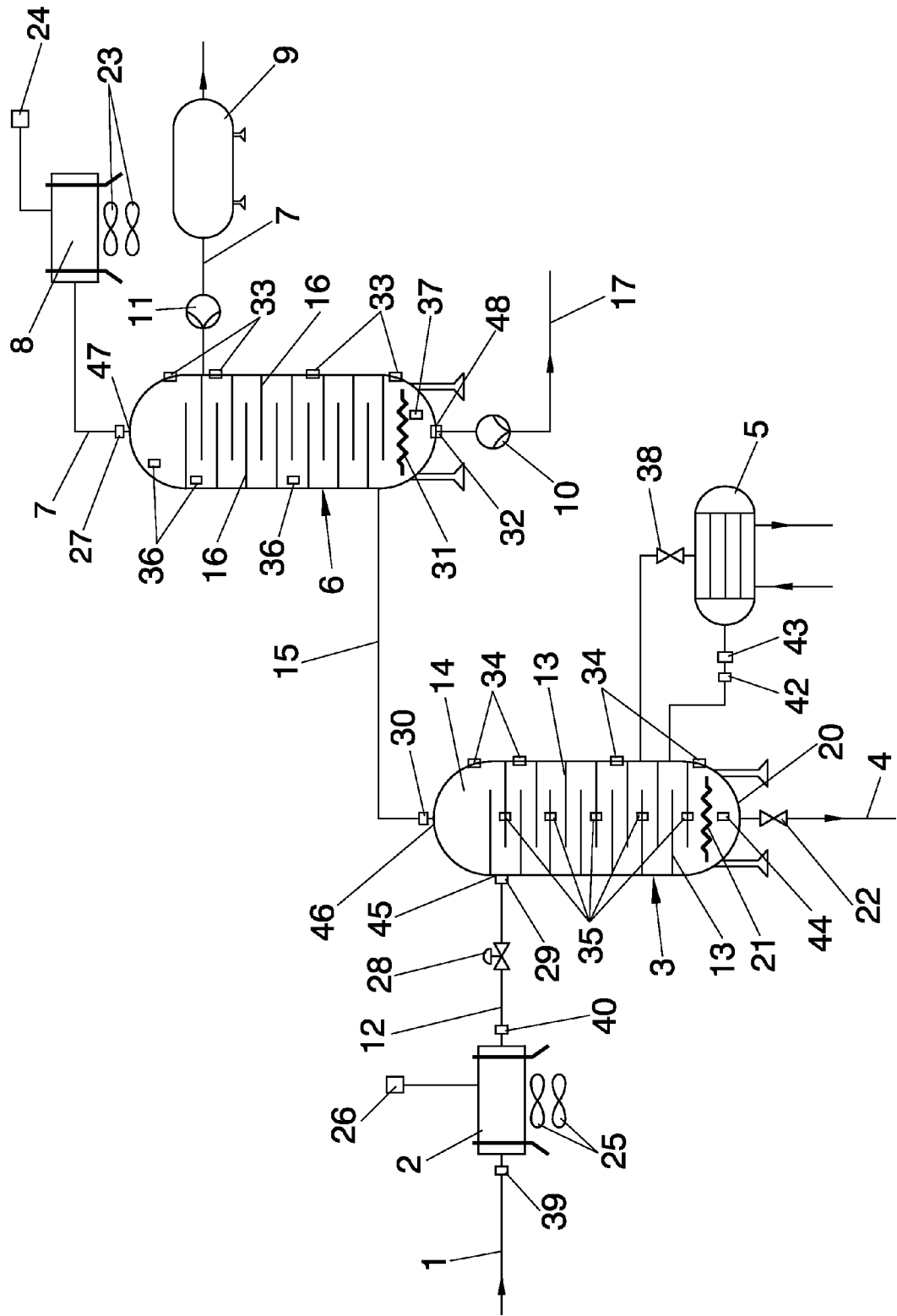

PLANT FOR RECOVERING DEGRADED HEAT TRANSFER OIL FROM A SOLAR THERMAL FACILITY AND METHOD FOR SAID RECOVERY

This application is the U.S. national phase of International Patent Application No. PCT/ES2011/070341, filed May 12, 2011, which claims priority to Spanish Patent Application No. P201030711, filed May 13, 2010.

OBJECT OF THE INVENTION

The present invention is applicable to the technical field of solar energy capture in parabolic trough collector plants, specifically in the regeneration of the heat transfer oil used in said plants.

The object of the invention is a plant for regenerating degraded heat transfer oil for solar thermal facilities and a method for carrying out said regeneration.

BACKGROUND OF THE INVENTION

Parabolic trough collector solar plants normally use a heat transfer fluid that can be both thermal oil and water, in direct steam generation collectors. In the case of collectors that use oil as a heat transfer fluid, a thermal oil is heated in the collectors which, after passing through a heat exchanger, allows the production of pressurized steam that is subsequently expanded in a conventional Rankine cycle turbine.

There are a large variety of compounds which are used as thermal oil for solar plants, each having specific characteristics. Specifically, one of these oils is composed of a eutectic mixture of biphenyl and diphenyl oxide (marketed under the name Dowtherm A or Therminol VP1). The properties of this type of oil make it especially suited for heat transfer within a temperature range of up to 400° C.

The thermal stability of a fluid is determined by its composition. When the temperature of the oil reaches the working values of the solar thermal plant (temperatures of up to 400° C.), the molecular bonds of the fluid structure break to form two large types of degradation products: light compounds and heavy compounds.

In the specific case of the aforementioned oil, it undergoes slow decomposition into light components (low boilers), essentially benzene and phenol, and heavy components (high boilers), essentially o-terphenyl, m-terphenyl, p-terphenyl and 2-phenoxybiphenyl. The concentration of these oil degeneration products should not exceed certain limits due to the fact that light components, having a high vapour pressure, increase the pressure in the system and can cause cavitation in the pumps, while the heavy components limit the efficiency of the heat transfer as, among other things, they reduce the specific heat of the heat transfer oil and increase its viscosity.

In order to avoid accumulation, said heavy components and light components must be periodically removed from the facility, as they modify the properties of the heat transfer oil.

It has been experimentally verified that simple flash distillation (single-step distillation) followed by partial condensation of the vapour current generated in the distiller is unable to effectively regenerate the oil. The separation of significant amounts of heavy components is necessarily associated with considerable oil losses. Thus, for example, the elimination of 70% of the heavy components entails oil losses of approximately 30%.

The technical problem being addressed consists of describing a thermal oil regeneration plant capable of minimising oil degradation and oil losses and improving regeneration performance, as the price of said oil is considerably high.

DESCRIPTION OF THE INVENTION

The present invention solves the addressed problem by means of a plant for regenerating the heat transfer oil circulating through the collectors of a solar thermal plant, according to a first object of the invention, and a method for carrying out said regeneration, according to a second object of the invention.

The regeneration plant comprises:
a distillation column (stripper) to separate the heavy components;
a boiler;
a rectifier for separating the light components;
an air condenser;
a backflow tank;
a first pump and second pump.

The plant of the invention can additionally comprise an air cooler. In such case, said air cooler is the first element of the plant. The degraded oil reaches the air cooler, at a high temperature, from the solar facility. Preferably, the temperature at the inlet of the air cooler is comprised between 295° C. and 310° C. The temperature at the outlet of the air cooler is preferably comprised between 95° C. and 110° C. Cooled oil is obtained at the outlet of the air cooler.

Said temperature of between 95° C. and 110° C., preferably 100° C., is sufficiently low to prevent heavy components from being carried away by the vapour that flows out of the top of the distillation column, with respect to the case of not using pre-cooling, which substantially improves regeneration performance. Cooling the degraded oil before introducing it in the distillation column improves the performance of said distillation column.

In the absence of an air cooler, the degraded oil is introduced directly in the distillation column. In the event of having an air cooler, at the outlet of said air cooler the cooled oil is introduced in the distillation column. The distillation column comprises a column of first perforated plates made of carbon steel, and a boiler. The oil enters the distillation column through the upper part thereof and is heated in said distillation column by the boiler.

The harmful heavy components (o, m and p—terphenyls) are separated into tails by gravity, together with an amount of lost oil, while practically all the oil and light components pass through the successive first plates until they reach the upper part of the distillation column, called the head, where they leave (i.e. are withdrawn from) the distillation column in the form of vapor.

Preferably, the boiler is a thermosyphon-type heat exchanger that works by means of natural circulation of the hot oil from the solar facility.

The vapor, substantially free of heavy components, which leaves the distillation column through the head thereof, accesses the rectifier. The rectifier is a distillation column having a plurality of second perforated plates made of carbon steel. The regenerated oil is recovered in the lower part of the rectifier and the light components are recovered in the upper part thereof, which are subsequently condensed in the air condenser and conveyed toward a backflow tank.

Additionally, the invention includes a first pump and a second pump. The first pump conveys the regenerated oil toward its working fluid circuit in the solar thermal collectors. The second pump conveys the light components from the backflow tank toward the rectifier. The circulation enabled by the second pump is necessary because the pressure in the tank is lower than in the rectifier.

By means of the invention, regenerated oil with 99.4% purity is obtained, compared to the initial 94.3% purity of the oil prior to regeneration.

DESCRIPTION OF THE DRAWINGS

In order to complement the description being made and with the object of helping to better understand the characteristics of the invention, according to a preferred practical embodiment thereof, a set of drawings are included wherein the following is represented in an illustrative and non-limiting manner:

FIG. 1 shows a schematic view of the plant according to the invention.

PREFERRED EMBODIMENT OF THE INVENTION

Following is a description of a preferred embodiment of the invention, with the aid of the single FIG. 1.

The plant for regenerating degraded heat transfer oil (1) from a solar thermal facility according to the invention is used to regenerate the oil used in said solar thermal facility, which is a eutectic mixture of biphenyl (26.5%) and diphenyl oxide (73.5%). Table 1 shows the characteristics of this oil, specifically of Dowtherm A.

TABLE 1

Properties of Dowtherm A thermal oil

| Temperature ° C. | Vapour pressure (bar) | Viscosity (mPa · s) | Specific heat (kJ/kg/K) | Thermal conductivity (W/m/K) | Density (kg/m³) |
| --- | --- | --- | --- | --- | --- |
| 12 | 0 | 5.52 | 1.55 | 0.14 | 1065.9 |
| 15 | 0 | 5 | 1.558 | 0.1395 | 1063.5 |
| 20 | 0 | 4.29 | 1.573 | 0.1387 | 1059.6 |
| 30 | 0 | 3.25 | 1.601 | 0.1371 | 1051.7 |
| 40 | 0 | 2.56 | 1.63 | 0.1355 | 1043.8 |
| 50 | 0 | 2.07 | 1.658 | 0.1339 | 1035.8 |
| 60 | 0 | 1.72 | 1.687 | 0.1323 | 1027.8 |
| 70 | 0 | 1.46 | 1.715 | 0.1307 | 1019.7 |
| 80 | 0 | 1.25 | 1.744 | 0.1291 | 1011.5 |
| 90 | 0 | 1.09 | 1.772 | 0.1275 | 1003.2 |
| 100 | 0.01 | 0.97 | 1.8 | 0.1259 | 994.9 |
| 110 | 0.01 | 0.86 | 1.828 | 0.1243 | 986.5 |
| 120 | 0.01 | 0.77 | 1.856 | 0.1227 | 978.1 |
| 130 | 0.02 | 0.7 | 1.884 | 0.1211 | 969.5 |
| 140 | 0.03 | 0.64 | 1.912 | 0.1195 | 960.9 |
| 150 | 0.05 | 0.58 | 1.94 | 0.1179 | 952.2 |
| 160 | 0.07 | 0.53 | 1.968 | 0.1163 | 943.4 |
| 170 | 0.09 | 0.49 | 1.996 | 0.1147 | 934.5 |
| 180 | 0.13 | 0.46 | 2.023 | 0.1131 | 925.5 |
| 190 | 0.18 | 0.42 | 2.051 | 0.1115 | 916.4 |
| 200 | 0.24 | 0.39 | 2.079 | 0.1099 | 907.1 |
| 210 | 0.32 | 0.37 | 2.107 | 0.1083 | 897.8 |
| 220 | 0.42 | 0.34 | 2.134 | 0.1067 | 888.3 |
| 230 | 0.54 | 0.32 | 2.162 | 0.1051 | 878.7 |
| 240 | 0.69 | 0.3 | 2.19 | 0.1035 | 868.9 |
| 250 | 0.87 | 0.28 | 2.218 | 0.1019 | 859 |
| 260 | 1.08 | 0.27 | 2.245 | 0.1003 | 849 |
| 270 | 1.33 | 0.25 | 2.273 | 0.0987 | 838.7 |
| 280 | 1.63 | 0.24 | 2.302 | 0.0971 | 828.3 |
| 290 | 1.98 | 0.22 | 2.33 | 0.0955 | 817.7 |
| 300 | 2.38 | 0.21 | 2.359 | 0.0939 | 806.8 |
| 310 | 2.84 | 0.2 | 2.388 | 0.0923 | 795.8 |
| 320 | 3.37 | 0.19 | 2.417 | 0.0907 | 784.4 |
| 330 | 3.96 | 0.18 | 2.448 | 0.0891 | 772.8 |
| 340 | 4.64 | 0.17 | 2.479 | 0.0875 | 760.9 |
| 350 | 5.39 | 0.16 | 2.511 | 0.0859 | 748.6 |
| 360 | 6.24 | 0.15 | 2.544 | 0.0843 | 735.9 |
| 370 | 7.18 | 0.15 | 2.579 | 0.0827 | 722.8 |
| 380 | 8.22 | 0.14 | 2.616 | 0.0811 | 709.2 |
| 390 | 9.37 | 0.13 | 2.657 | 0.0795 | 695 |
| 400 | 10.64 | 0.13 | 2.701 | 0.0779 | 680.2 |

The initial composition by weight of the degraded heat transfer oil (1) is shown below. The initial conditions of said degraded heat transfer oil (1) are 302° C. and 33 bar:

| | |
| --- | --- |
| Benzene | 0.4% |
| Phenol | 1.4% |
| Ortho-Terphenyl | 2.9% |
| Meta-Terphenyl | 0.5% |
| Para-Terphenyl | 0.5% |
| Dowtherm A | 94.3% |

Table 2 below shows the composition of the currents flowing in and out of the plant of the invention.

TABLE 2

Composition of the currents flowing in and out of the plant of the invention.

| | Oil to be regenerated | Heavy components | Light components | Regenerated oil |
| --- | --- | --- | --- | --- |
| Flow (kg/h) | 6,500 | 253.5 | 117 | 6129.5 |
| Benzene | 0.4 | — | 24.1 | 173 ppm |
| Phenol | 1.4 | — | 60.3 | 0.3 |
| Ortho-Terphenyl | 2.9 | 68.4 | — | 0.3 |
| Meta-Terphenyl | 0.5 | 12.1 | — | 152 ppm |
| Para-Terphenyl | 0.5 | 12.2 | — | 115 ppm |
| Dowtherm A | 94.3 | 7.2 | 15.6 | 99.4 |
| Temperature (° C.) | 302° C. | 351 | 138 | 275 |
| Pressure (bar) | 33 | 1.5 | 1.5 | 1.5 |

As shown in Table 2, the facility of the invention is appropriate for treating a volume of degraded heat transfer oil (1) of 6500 kg/h, which allows processing of the total amount of oil used in the solar thermal plant, 1300 tonnes, in a total of 200 hours. The indicated volumes can have variations of up to +−10% without significantly affecting the performance of the plant of the invention.

The plant comprises the following elements:
an air cooler (2);
a distillation column (3) for separating the heavy components (4);
a boiler (5);
a rectifier (6) for separating the light components (7);
an air condenser (8);
a backflow tank (9);
a first pump (10) and second pump (11).

The air cooler (2) receives the degraded heat transfer oil (1) from the solar thermal facility and lowers its temperature from an inlet temperature of 302° C. to an outlet temperature of 100° C. The air cooler (2) incorporates means for controlling outlet temperature, which comprise a frequency converter (26) or various individually controlled fans (25). The air cooler (2) also incorporates inlet temperature meter (39) and outlet temperature meter (40) and a flow meter (28).

The output product of the air cooler (2) is cooled oil (12), which is introduced in the distillation column (3), which comprises a column of first perforated plates (13) made of carbon steel, and the above mentioned boiler (5). The cooled oil (12) enters the distillation column (3) through the upper part thereof and is heated in said distillation column (3) by the boiler (5), which is a thermosyphon-type heat exchanger, in order to evaporate the products in the lower part of the distillation column (3) by means of a current of the hot oil coming from the solar thermal facility.

The boiler (5) incorporates temperature meter (42) and flow meter (43) and a flow control valve (38).

The harmful heavy components (4) (o, m and p—terphenyls) are separated into tails by gravity, together with an amount of lost oil, while the rest of the oil and light components rises from the distillation column (3) until reaching the head (14), where they leave said distillation column (3) in the form of vapor (15).

The distillation column (3) incorporates a pressure transmitter (29) at the inlet (45) and a pressure and temperature transmitter (30) at the outlet (46). It also incorporates a plurality of temperature transmitters (35) distributed throughout the interior thereof, one every three first plates (13), and one temperature transmitter (44) in the lower part thereof, four level switches (34) and an automatic valve (22) at the outlet (20) of the heavy components (4).

The distillation column (3) incorporates an electric resistance (21) in the lower part thereof for the purpose of maintaining the oil in a liquid state (250° C.) in the event that the power supply is interrupted.

The vapor (15) free of heavy components (4) leaves the distillation column (3) through the head (14) and accesses the rectifier (6), which is a distillation column having a plurality of second perforated plates (16) made of carbon steel. The regenerated oil (17) is recovered in the lower part of the rectifier (6) and the light components (7) are collected in the upper part thereof, which are condensed in the air condenser (8) and conveyed toward a backflow tank (9).

The rectifier (6) incorporates pressure and temperature transmitters (27, 32) at the outlets (47,48), temperature transmitters (36) distributed throughout the interior of the rectifier (6), an additional temperature transmitter (37) in the lower part and level switches (33), in addition to incorporating an electric resistance (31) in the lower part thereof for the purpose of maintaining the fluid in a liquid state (30° C.) in the event that the power supply is interrupted.

The air condenser (8) is equipped with means for controlling outlet temperature, preferably a frequency converter (24) or a plurality of independently controlled fans (23).

The accessory elements, such as valves, auxiliary equipment and instruments, have been described in detail, although these may vary in the final construction.

Additionally, the invention incorporates a first pump (10), which circulates the regenerated oil (17) back to the solar thermal facility, and a second pump (11) that recirculates the light components (7) from the backflow tank (9) to the rectifier (6).

The invention claimed is:

1. A plant for regenerating heat transfer oil from degraded heat transfer oil used in a solar thermal facility, the plant comprising:
    a distillation column for separating heavy components from the degraded heat transfer oil, the distillation column comprising an upper part and a lower part,
    the upper part having:
        a first inlet for receiving the degraded heat transfer oil,
        a head having a first outlet for expelling light component vapour,
        a pressure transmitter at the first inlet, and
        a pressure and temperature transmitter at the first outlet;
    the lower part of the distillation column having
        a fourth outlet for letting the heavy components out,
        an electric resistance for maintaining the degraded heat transfer oil in a liquid state, and
        an automatic valve at the fourth outlet,
    wherein the distillation column further comprising:
        a plurality of temperature transmitters distributed inside the distillation column; and
        level switches in the distillation column;
    a rectifier for receiving the vapor, the rectifier having:
        an upper part having a second outlet for expelling light components;
        a lower part having a third outlet for expelling regenerated heat transfer oil;
        pressure and temperature transmitters at at least one of the second and third outlets;
        temperature transmitters distributed throughout an interior of the rectifier;
        a temperature transmitter in the lower part;
        level switches in the rectifier; and
        an electric resistance in the lower part for maintaining the fluid in a liquid state.

2. The plant of claim 1, wherein the temperature transmitters inside the distillation column are distributed one every three first plates.

3. The plant of claim 1, further comprising an air condenser for condensing the light components collected in the upper part of the rectifier.

4. The plant of claim 1, further comprising a first pump for circulating the regenerated oil back to the solar thermal facility.

5. The plant of claim 1, further comprising:
    a backflow tank for receiving the light components condensed in the air condenser, and
    a second pump for recirculating the light components from the backflow tank to the rectifier.

6. A plant for regenerating heat transfer oil from degraded heat transfer oil used in a solar thermal facility, the plant comprising:
    a distillation column for separating heavy components from the degraded degraded heat transfer oil, the distillation column comprising an upper part and a lower part,
    the upper part having:
        a first inlet for receiving the degraded heat transfer oil, and
        a head having a first outlet for expelling light component vapor; and
    a rectifier for receiving the vapor, the rectifier having:
        an upper part having a second outlet for expelling light components; and
        a lower part having a third outlet for expelling regenerated heat transfer oil;
    wherein the lower part of the distillation column further comprises a fourth outlet for letting the heavy components out;
    an air condenser for condensing the light components collected in the upper part of the rectifier, wherein the air condenser comprises an outlet temperature control mechanism for controlling outlet temperature.

7. The plant of claim 6, wherein the outlet temperature control mechanism of the air condenser is selected from a group consisting of
   a frequency converter; and
   a plurality of independently controlled fans.

8. The plant of claim 6, further comprising an air cooler for cooling the degraded heat transfer oil from an inlet temperature to a cooled oil outlet temperature.

9. The plant of claim 8, wherein the air cooler further comprises an outlet temperature control mechanism for controlling the outlet temperature.

10. The plant of claim 9, wherein the outlet temperature control mechanism of the air cooler is selected from a group consisting of:
    a plurality of independently controlled fans; and
    a frequency converter.

11. The plant of claim 8, wherein the air cooler comprises inlet and outlet temperature meters and a flow meter.

12. The plant of claim 6, wherein the distillation column comprises a column of perforated first plates.

13. The plant of claim 6, further comprising a boiler configured so as to use hot heat transfer oil coming from the solar thermal facility for evaporating the degraded heat transfer oil in the lower part of the distillation column.

14. The plant of claim 13, wherein the boiler further comprises temperature and flow meters and a flow control valve.

15. The plant of claim 6, wherein the rectifier comprises a plurality of perforated second plates.

16. The plant of claim 6, further comprising a first pump for circulating the regenerated oil back to the solar thermal facility.

17. The plant of claim 6, further comprising:
    a backflow tank for receiving the light components condensed in the air condenser, and
    a second pump for recirculating the light components from the backflow tank to the rectifier.

18. A process for regenerating heat transfer oil from degraded heat transfer oil used in a solar thermal facility, comprising the following steps:
    (a) cooling the degraded heat transfer oil in an air cooler, comprising introducing in the air cooler the degraded heat transfer oil from the solar thermal facility for lowering the temperature of the degraded heat transfer oil from an inlet temperature to an outlet temperature,
    (b) introducing the degraded heat transfer oil cooled by the air cooler from step (a) to the distillation column through an upper part thereof;
    (c) heating the degraded heat transfer oil from step (b) using a boiler;
    (d) separating the degraded heat transfer oil from step (c) into heavy components and light components including vapor, wherein the heavy components are separated into tails by gravity, together with an amount of lost degraded heat transfer oil, while the rest of the degraded heat transfer oil and light components rise up the distillation column until reaching a head, where through the rest of the degraded heat transfer oil and the light components leave the distillation column in a vapor;
    (e) introducing the vapor from step (d) to a rectifier;
    (f) recovering regenerated heat transfer oil in a lower part of the rectifier;
    (g) collecting the light components in an upper part of the rectifier;
    (h) condensing the light components collected from step (g) using an air condenser;
    (i) conveying the light components condensed in the air condenser from step (h) to a backflow tank;
    (j) circulating the regenerated heat transfer oil from step (f) back to the solar thermal facility using a first pump; and
    (k) recirculating the light components from the backflow tank from step (i) to the rectifier using a second pump.

* * * * *